(12) United States Patent
Miyoshi

(10) Patent No.: US 8,970,714 B2
(45) Date of Patent: Mar. 3, 2015

(54) IMAGE CAPTURING APPARATUS, IMAGE PROCESSING APPARATUS, AND METHOD THEREOF

(75) Inventor: Ai Miyoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/470,614

(22) Filed: May 14, 2012

(65) Prior Publication Data

US 2012/0307093 A1 Dec. 6, 2012

(30) Foreign Application Priority Data

May 31, 2011 (JP) .................. 2011-122597

(51) Int. Cl.
- H04N 5/232 (2006.01)
- H04N 5/262 (2006.01)
- G06T 5/50 (2006.01)
- H04N 5/225 (2006.01)

(52) U.S. Cl.
CPC .............. H04N 5/23212 (2013.01); G06T 5/50 (2013.01); H04N 5/2258 (2013.01); H04N 5/23229 (2013.01); H04N 5/2621 (2013.01); G06T 2200/21 (2013.01)
USPC ...................... 348/211.11; 348/239

(58) Field of Classification Search
USPC .......................... 382/254, 255, 276, 277, 285
See application file for complete search history.

(56) References Cited

U.S. PATENT DOCUMENTS

| | | | |
|---|---|---|---|
| 6,570,582 B1 * | 5/2003 | Sciammarella et al. | 345/660 |
| 2002/0033821 A1 * | 3/2002 | Sfarti | 345/423 |
| 2005/0001933 A1 * | 1/2005 | Yoshikawa et al. | 348/564 |
| 2009/0060274 A1 | 3/2009 | Kita | |
| 2010/0103175 A1 | 4/2010 | Okutomi et al. | |
| 2010/0128145 A1 | 5/2010 | Pitts et al. | |
| 2010/0318467 A1 * | 12/2010 | Porter et al. | 705/51 |
| 2011/0050846 A1 * | 3/2011 | Miceli | 348/42 |
| 2011/0052076 A1 | 3/2011 | Yashiro | |

FOREIGN PATENT DOCUMENTS

| | | | |
|---|---|---|---|
| JP | 2005-198334 A | | 7/2005 |
| JP | 2008-256826 | * | 10/2008 |
| JP | 2008-256826 A | | 10/2008 |
| JP | 2009-060379 A | | 3/2009 |
| JP | 2011-022796 A | | 2/2011 |
| JP | 2011-053959 A | | 3/2011 |
| WO | 2008/050904 A1 | | 5/2008 |

\* cited by examiner

*Primary Examiner* — Aung S Moe
*Assistant Examiner* — Eul Cowan
(74) *Attorney, Agent, or Firm* — Fitzpatrick, Cella, Harper & Scinto

(57) ABSTRACT

An image processing apparatus and method relate to an imaging process which is applied to image data captured by an image capturing apparatus such as a multi-eye camera, multi-view camera, and the like. The image processing apparatus and method generates synthetic image data which focused on a curved focus surface by compositing multi-view image data captured from multi-viewpoints.

13 Claims, 18 Drawing Sheets

F I G. 12A
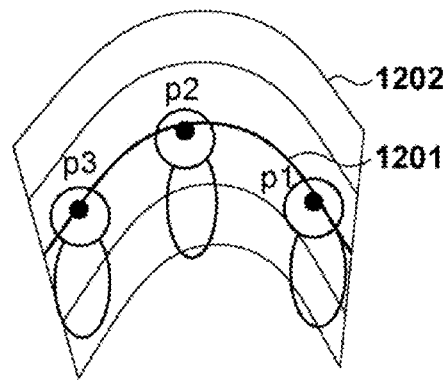
F I G. 12B
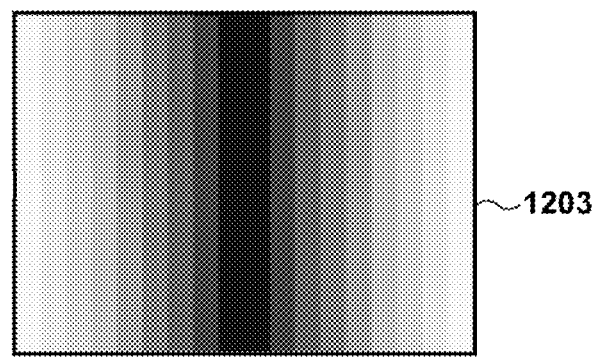
F I G. 12C
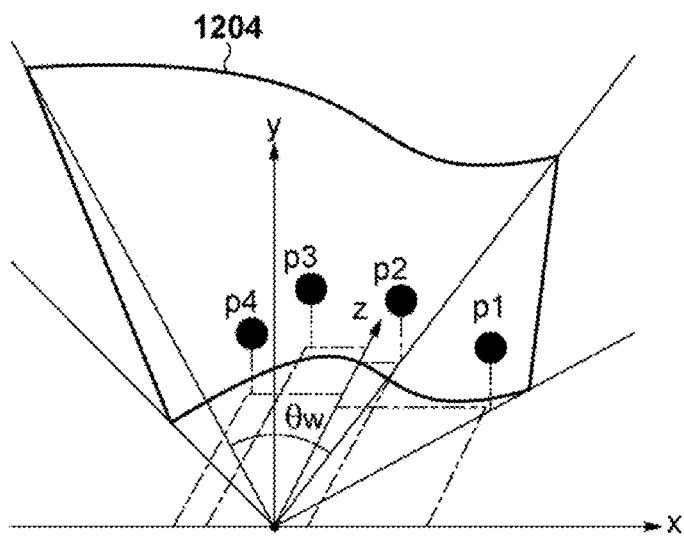

IMAGE CAPTURING APPARATUS, IMAGE PROCESSING APPARATUS, AND METHOD THEREOF

BACKGROUND OF THE INVENTION

1. Field of the Invention

The present invention relates to an imaging process applied to image data captured by an image capturing apparatus such as a multi-eye camera.

2. Description of the Related Art

There exists a technique of generating an image from a plurality of images captured at different positions by changing the focus or the depth of field. In this technique, a plurality of images are deformed in accordance with the capturing position and the distance to the object to be in focus. The deformed images are composited to generate an image having a shallow depth of field (refocus process).

There also exists a technique of changing the depth of field so as to make all objects fall in focus. In the invention of Japanese Patent Laid-Open No. 2011-022796, the refocus process is performed based on a plurality of images from different viewpoints. If there are a plurality of objects, focus on them is obtained by pan-focus. However, since these techniques attain focus on the plurality of objects by deepening the depth of field or using pan-focus, an image having a shallow depth of field cannot be obtained.

In addition, a technique has been proposed to composite an image having focus on a plane that does not face a camera. However, if a plurality of objects to be in focus are not placed on the same plane but interspersed, an image having a shallow depth of field and focus on the objects cannot be generated even by this technique.

SUMMARY OF THE INVENTION

In one aspect, an image processing method comprising the step of compositing multi-view image data obtained by capturing from a plurality of viewpoints so as to generate synthetic image data having focus on a curved focus surface.

According to the aspect, it is possible to generate image data having focus on an arbitrary focus surface from a plurality of image data obtained by capturing an object from different capturing positions.

Further features of the present invention will become apparent from the following description of exemplary embodiments with reference to the attached drawings.

BRIEF DESCRIPTION OF THE DRAWINGS

FIGS. 12A to 12C are views for explaining a virtual focus surface (curved surface) and a virtual focus surface image.

DESCRIPTION OF THE EMBODIMENTS

Image processing according to the embodiments of the present invention will now be described in detail with reference to the accompanying drawings.

First Embodiment

Schematic Arrangement of Image Capturing Apparatus

The schematic arrangement of an image capturing apparatus 140 according to the embodiment will be described with reference to the schematic view of FIG. 1.

Figure 1:
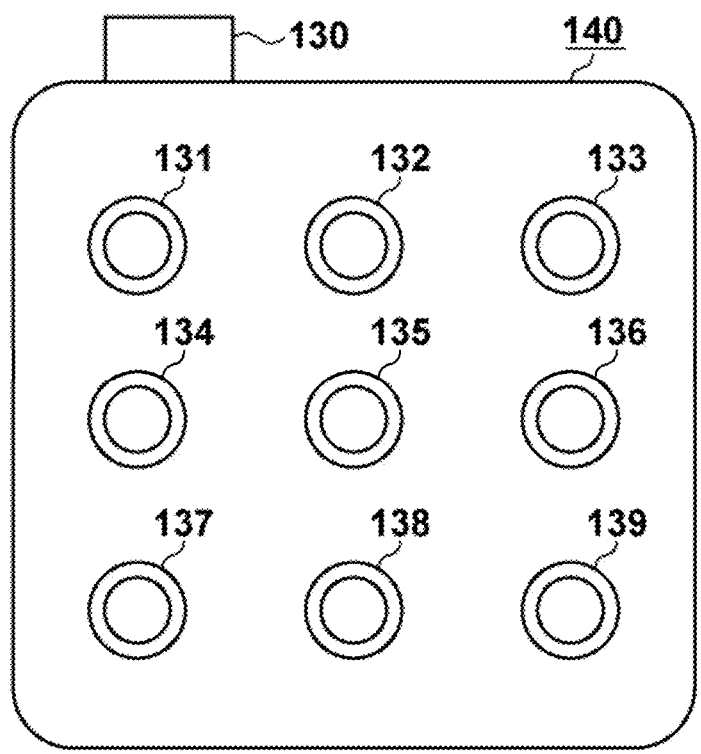
FIG. 1 is a schematic view for explaining the schematic arrangement of an image capturing apparatus according to an embodiment.

As shown in FIG. 1, a plurality of image capturing units 131 to 139 are arranged on the front surface of the image capturing apparatus 140. A release button 130 to instruct the start of image capturing is arranged on the upper surface. The image capturing units 131 to 139 are uniformly arranged in a square matrix. The vertical axes, horizontal axes, and optical axes of these image capturing units are directed in the same directions.

The image capturing apparatus 140, which is called a multi-view camera or a multi-eye camera, composites a plurality of images captured by the image capturing units 131 to 139 to generate an image having a shallow depth of field. At this time, the apparatus generates an image having a shallow depth of field in which focus is obtained on all arbitrary objects that are not on a plane, and a blur occurs in regions outside that portion.

When the user presses the release button 130, each of the image capturing units 131 to 139 extracts, from an image capturing device, an analog signal corresponding to the light information of an object whose image is formed on the image capturing device through a capturing lens, a diaphragm, and the like. The analog signal undergoes analog/digital conversion and image processing such as demosaicing so as to output image data.

The image capturing apparatus 140 can obtain an image data group by capturing a single object from a plurality of viewpoints. In this example, the image capturing apparatus includes nine image capturing units. The present invention is applicable as far as the apparatus includes a plurality of image capturing units, and the number of image capturing units is arbitrary. The image capturing units need not always be arranged uniformly in a square matrix and can be arranged arbitrarily. For example, the image capturing units may be arranged radially or linearly, or completely at random.

The present invention can also be applied to a plurality of image data obtained by capturing an object from different viewpoints while moving one image capturing unit using a pan head, a robot arm, or the like.

[Image Processing Apparatus]

Arrangement

Figure 2:
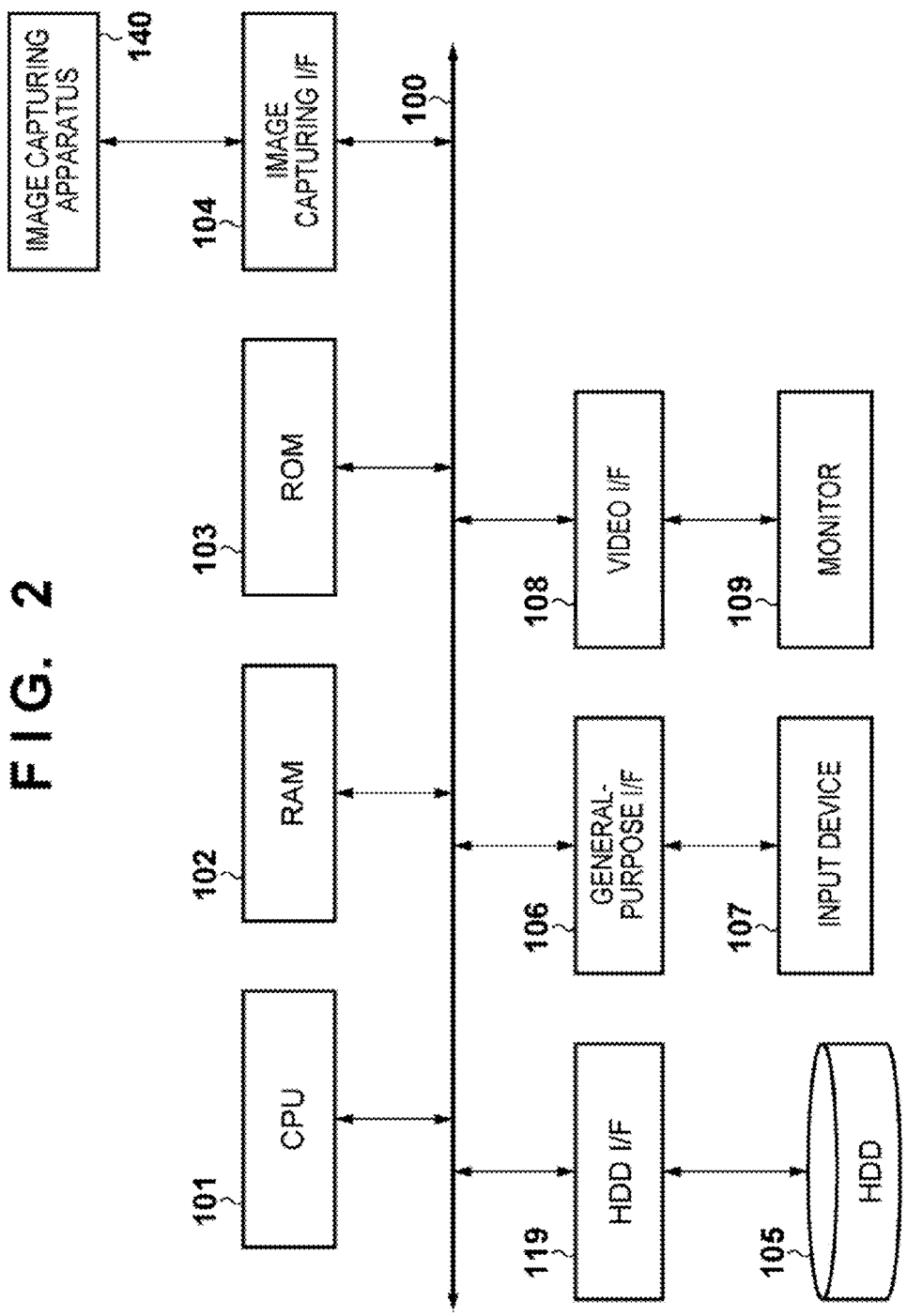
FIG. 2 is a block diagram for explaining the arrangement of an image processing apparatus according to the embodiment.

The arrangement of an image processing apparatus according to the embodiment will be described with reference to the block diagram of FIG. 2. Note that the image processing apparatus can be either incorporated in the image capturing apparatus 140 or separated from the image capturing apparatus 140 so as to communicate with the image capturing apparatus 140 via an interface to be described later and thus perform image processing to be described later.

A microprocessor (CPU) 101 executes various processes including image processing to be described later by executing programs stored in a read only memory (ROM) 103 and a hard disk drive (HDD) 105 using a random access memory (RAM) 102 as a work memory and controlling components to be described later through a system bus 100.

An image capturing interface (I/F) 104 is a serial bus interface such as a USB (Universal Serial Bus) or IEEE1394 and is connected to the image capturing apparatus 140. The CPU 101 can control the image capturing apparatus 140 via the image capturing I/F 104 to perform image capturing and receive captured data from the image capturing apparatus 140.

An HDD I/F 119 is, for example, a serial ATA interface and is connected to, for example, a secondary storage device such as the HDD 105 or an optical disk drive. The CPU 101 can read out data from the HDD 105 or write data to the HDD 105 through the HDD I/F 119. The CPU 101 can also expand, on the RAM 102, data stored in the HDD 105 or conversely store, in the HDD 105, data expanded on the RAM 102.

A general-purpose I/F 106 is a serial bus interface such as a USB or IEEE1394 and is connected to an input device 107 such as a keyboard, a mouse, or a touch panel, or a printer (not shown). A video I/F 108 is an interface such as a digital visual interface (DVI) or a high-definition multimedia interface (HDMI®) and is connected to a monitor 109 or the like. The CPU 101 displays a user interface (UI) on the monitor 109.

Functional Arrangement

Figure 3:
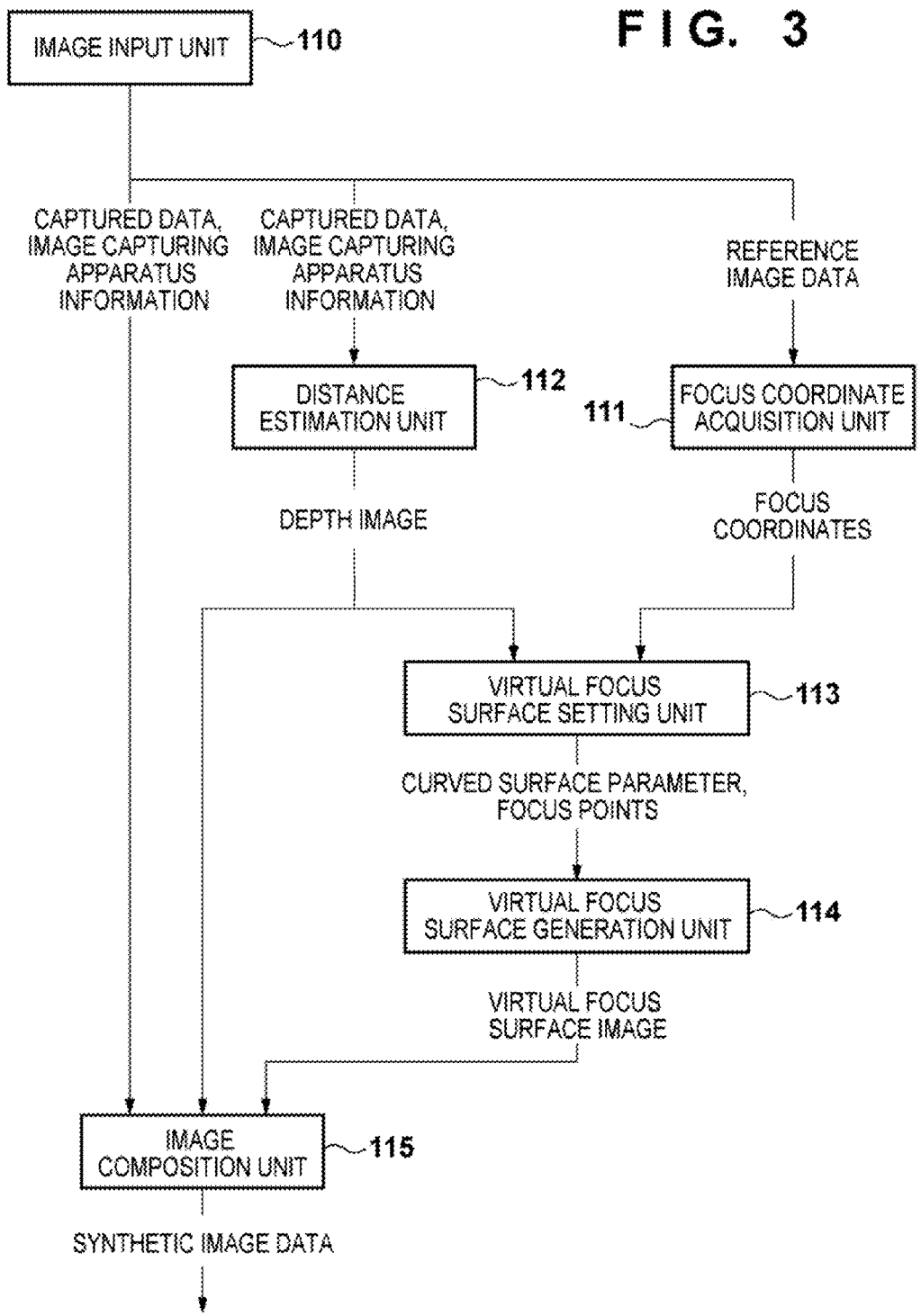
FIG. 3 is a block diagram for explaining the functional arrangement of the image processing apparatus.

The functional arrangement of the image processing apparatus will be described with reference to the block diagram of FIG. 3. Note that the functional arrangement shown in FIG. 3 is implemented by causing the CPU 101 to execute an image processing program. Details of each process of the functional arrangement will be described later.

An image input unit 110 inputs captured data and image capturing apparatus information representing the information of the apparatus (for example, the image capturing apparatus 140) that has captured the data and image capturing information (for example, shutter speed and stop number) from the image capturing apparatus 140, the HDD 105, or the like. Note that the captured data includes a plurality of image data captured by the plurality of image capturing units (for example, the image capturing units 131 to 139 of the image capturing apparatus 140). The image capturing apparatus information also represents the angle of view of the image capturing apparatus and the capturing positions (relative positional relationship) of the image capturing units.

A focus coordinate acquisition unit 111 receives reference image data and outputs focus coordinates representing the position where focus is obtained based on a user instruction. Note that the focus coordinate acquisition unit 111 may output focus coordinates input from the HDD 105 or the like. The reference image data is one of the plurality of image data. The reference image data can be any of the plurality of image data. For example, image data captured by the image capturing unit 135 that is located at the center out of the image capturing units 131 to 139 of the image capturing apparatus 140 is used as the reference image data.

A distance estimation unit 112 receives the plurality of image data and the image capturing apparatus information and estimates the depth value of a captured scene by stereo matching, thereby generating a depth image (distance map). A virtual focus surface setting unit 113 receives the focus coordinates and the depth image and calculates a curved surface parameter and a focus point representing three-dimensional coordinates.

A virtual focus surface generation unit 114 receives the curved surface parameter and the focus point and generates a virtual focus surface image. An image composition unit 115 receives the plurality of image data, the image capturing apparatus information, the depth image, and the virtual focus surface image and generates synthetic image data. Note that the CPU 101 displays the synthetic image data on the monitor 109 or stores it in the HDD 105.

Image Processing

Figure 4:
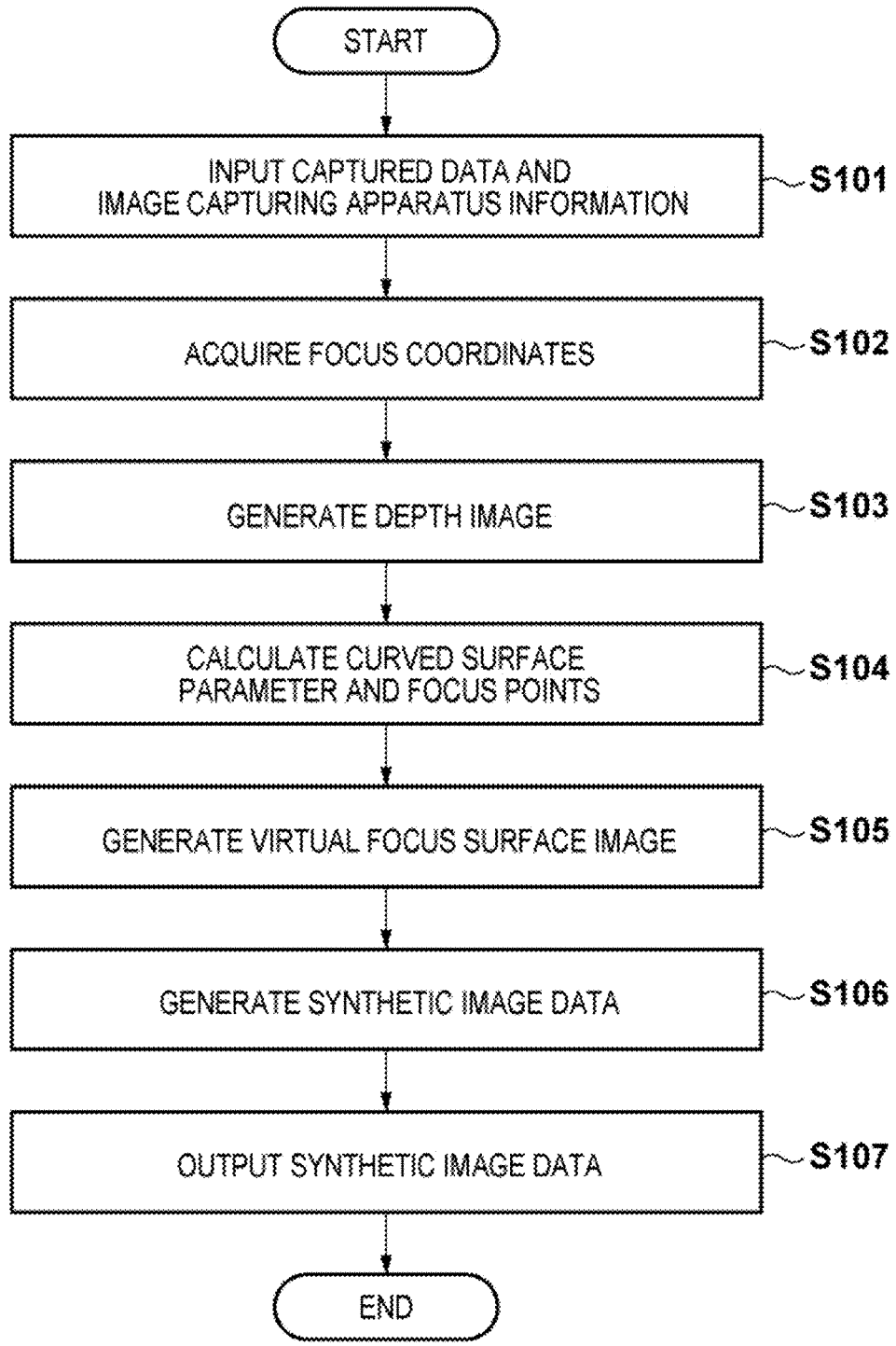
FIG. 4 is a flowchart for explaining image processing.

Image processing will be described with reference to the flowchart of FIG. 4. Note that the image processing shown in FIG. 4 is processing executed by the CPU 101 when, for example, a user instruction is input via the UI. Details of each process will be described later.

The CPU 101 causes the image input unit 110 to input captured data designated by the user and image capturing apparatus information (step S101) and the focus coordinate acquisition unit 111 to acquire focus coordinates Pn from reference image data (step S102).

Next, the CPU 101 causes the distance estimation unit 112 to execute distance estimation processing and thus generate a depth image (step S103) and the virtual focus surface setting unit 113 to execute virtual focus surface setting processing and thus calculate a curved surface parameter S and a focus point pn (step S104).

The CPU 101 then causes the virtual focus surface generation unit 114 to execute virtual focus surface generation processing and thus generate a virtual focus surface image (step S105). The CPU 101 causes the image composition unit 115 to execute image composition processing and thus generate synthetic image data (step S106) and output the synthetic image data (step S107).

Focus Coordinate Acquisition Unit

Figure 5A:
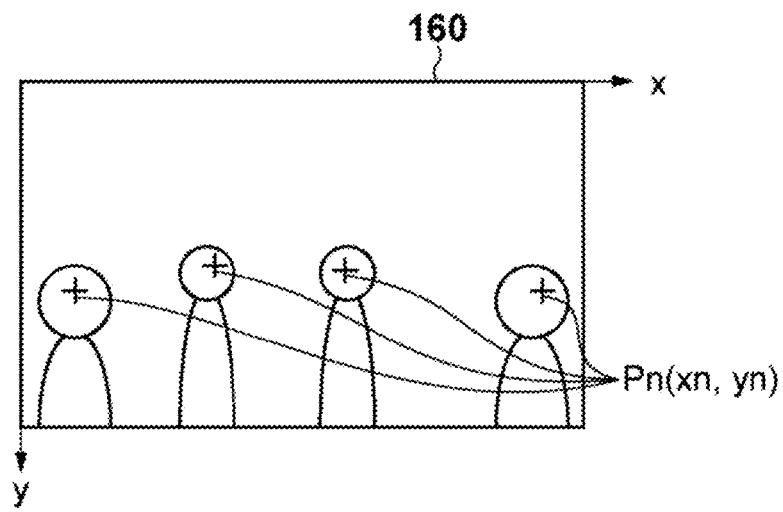
FIGS. 5A and 5B are views for explaining the process of a focus coordinate acquisition unit.
Figure 5B:
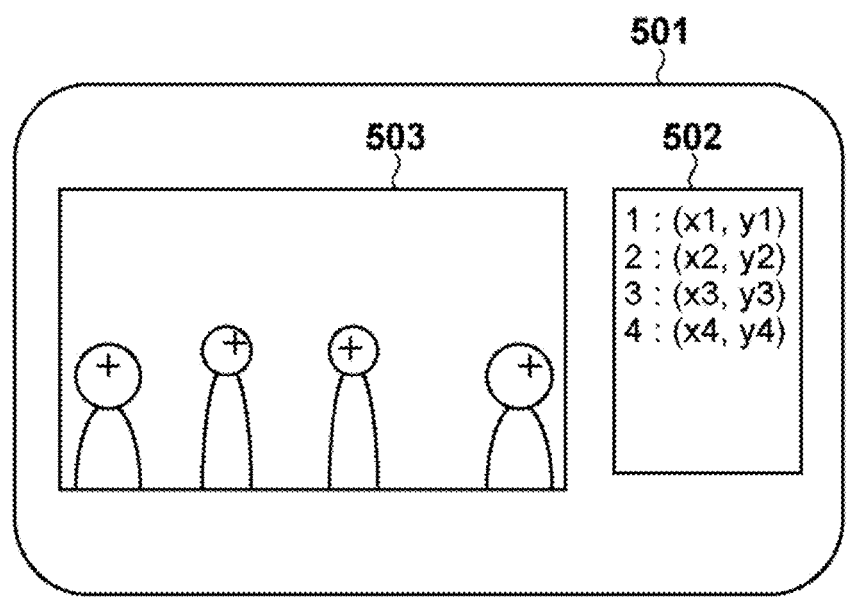

The process (step S102) of the focus coordinate acquisition unit 111 will be described with reference to FIGS. 5A and 5B.

As indicated by the example illustrated in FIG. 5B, the focus coordinate acquisition unit 111 displays an image (to be referred to as a reference image hereinafter) 503 represented by reference image data on a UI 501 and causes the user to input positions (to be referred to as focus positions hereinafter) where focus is to be obtained. The user designates the focus positions by using a pointing device or touching the screen of the UI 501.

When the focus positions are designated, the focus coordinate acquisition unit 111 displays the coordinates of the positions in the reference image 503 on a display unit 502 of the UI 501. Referring to FIGS. 5A and 5B, a cross "+" indicates a focus position designated by the user. The focus coordinates are expressed as coordinates Pn(xn, yn) (n=1, 2, . . . ) in a reference image 160, as shown in FIG. 5A.

Distance Estimation Unit

Figure 6:
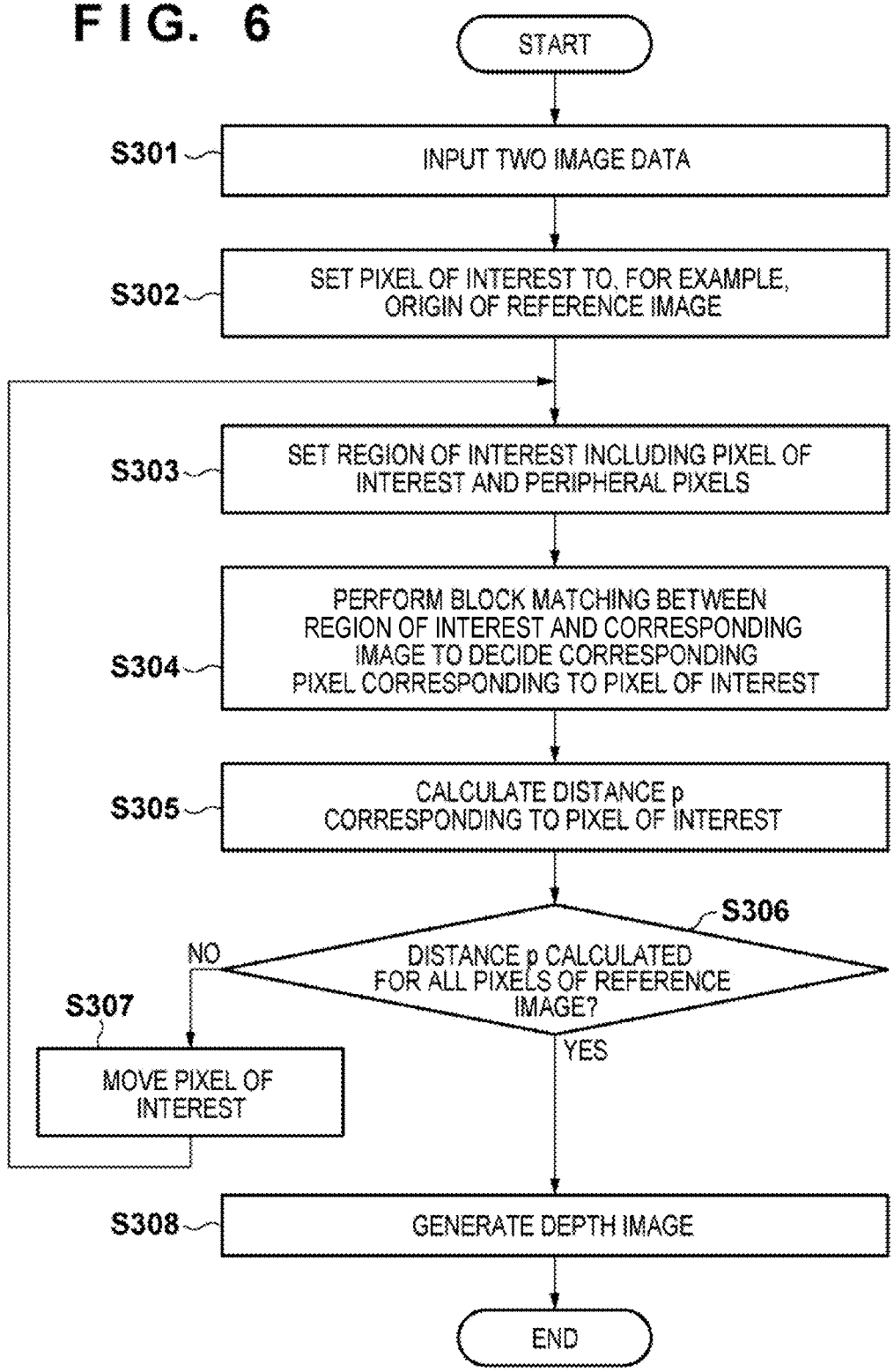
FIG. 6 is a flowchart for explaining the process of a distance estimation unit.

The distance estimation unit 112 estimates the distance of an object included in a captured scene based on a plurality of image data from different viewpoints. The stereo method is used to estimate the distance. A multi-baseline stereo method or the like is also usable. The process (step S103) of the distance estimation unit 112 will be described with reference to the flowchart of FIG. 6.

The distance estimation unit 112 receives two image data from different viewpoints out of captured data (step S301). For example, assume that image data captured by the image capturing unit 135 arranged at the center and image data captured by the image capturing unit 134 adjacent to the image capturing unit 135 in the horizontal direction are used. An image represented by the image data captured by the image capturing unit 135 will be referred to as a "reference image", and an image represented by the image data captured by the image capturing unit 134 will be referred to as a "non-reference image" hereinafter. Note that the image capturing unit of the non-reference image is not limited to the image capturing unit 134, and image data captured by any other image capturing unit may be used as the non-reference image.

Next, the distance estimation unit 112 sets the pixel of interest at, for example, the origin of the reference image (step S302) and sets a region of interest including the pixel of interest and peripheral pixels (step S303). Block matching is performed between the region of interest and the non-reference image, thereby deciding a pixel (corresponding pixel) of the non-reference image corresponding to the pixel of interest (step S304).

The distance estimation unit 112 then calculates a distance p corresponding to the pixel of interest based on the angle of view of the image capturing unit 134 that has captured the non-reference image and the relative position with respect to the image capturing unit 135, which are represented by the image capturing apparatus information, and the pixel of interest and the corresponding pixel (step S305).

Figure 7:
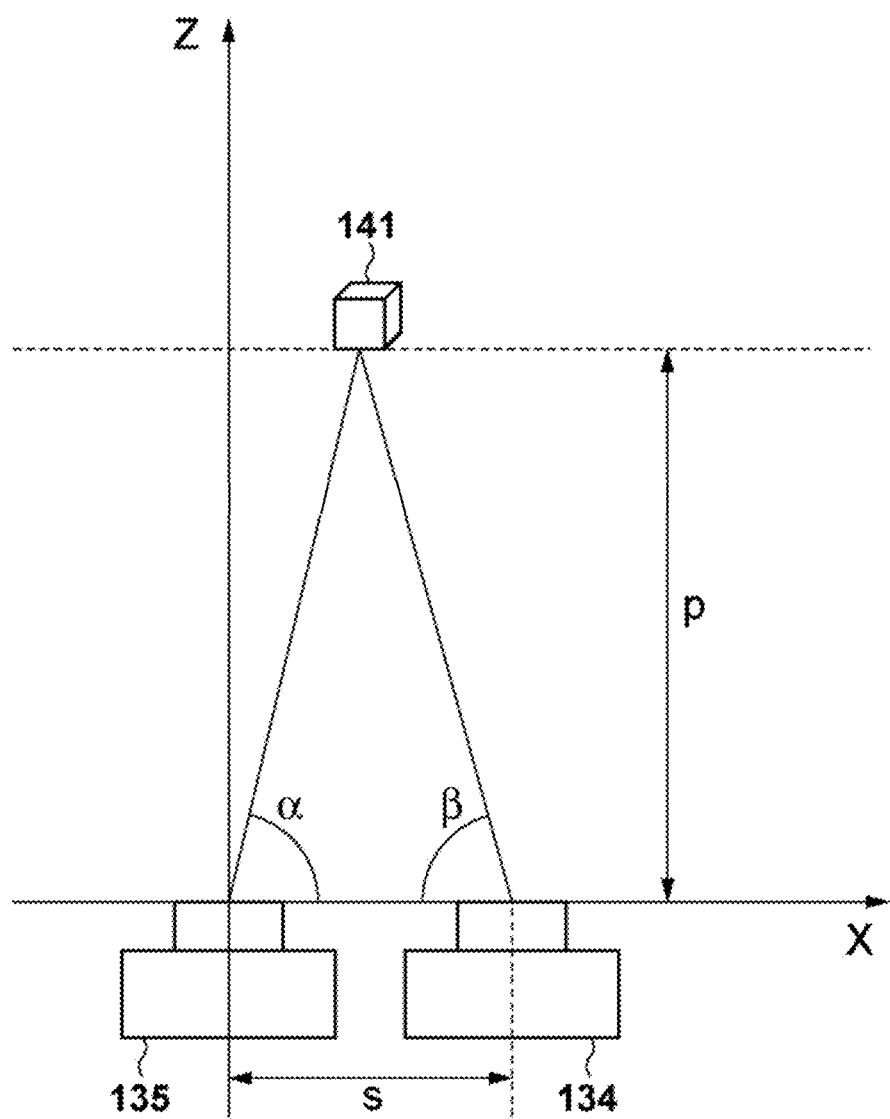
FIG. 7 is a view for explaining distance calculation.

Calculation of the distance p will be explained with reference to FIG. 7. An angle $\alpha$ is calculated from the horizontal angle of view of the image capturing unit 135, the capturing position of the reference image, and the coordinates of the pixel of interest. An angle $\beta$ is calculated from the horizontal angle of view of the image capturing unit 134, the capturing position of the non-reference image, and the coordinates of the corresponding pixel. A distance s is the distance between the image capturing unit 135 and the image capturing unit 134 and is calculated from the capturing positions of the reference image and the non-reference image. The distance p from an object 141 is calculated by $$p=\{\sin \alpha \cdot \sin \beta / \sin(\pi-\alpha-\beta)\}s \quad (1)$$

The distance estimation unit 112 determines whether the distances p corresponding to all pixels of the reference image are calculated (step S306). If an uncalculated pixel remains, the pixel of interest is moved (step S307), and the process returns to step S303. If the distances p corresponding to all pixels of the reference image are calculated, a depth image is generated by associating the distances p corresponding to all pixels with the pixel values (step S308).

Virtual Focus Surface Setting Unit

The virtual focus surface setting unit 113 calculates the focus point pn, that is, focus coordinates in a three-dimensional space from the received focus coordinates Pn. Next, the virtual focus surface setting unit 113 sets the order of the equation of the surface (to be referred to as a focus surface hereinafter) where focus is obtained in accordance with the calculated object position and outputs the order as the curved surface parameter S. In other words, the virtual focus surface setting unit 113 sets the shape of a focus surface according to the number and positions of the focus coordinates Pn.

Figure 8:
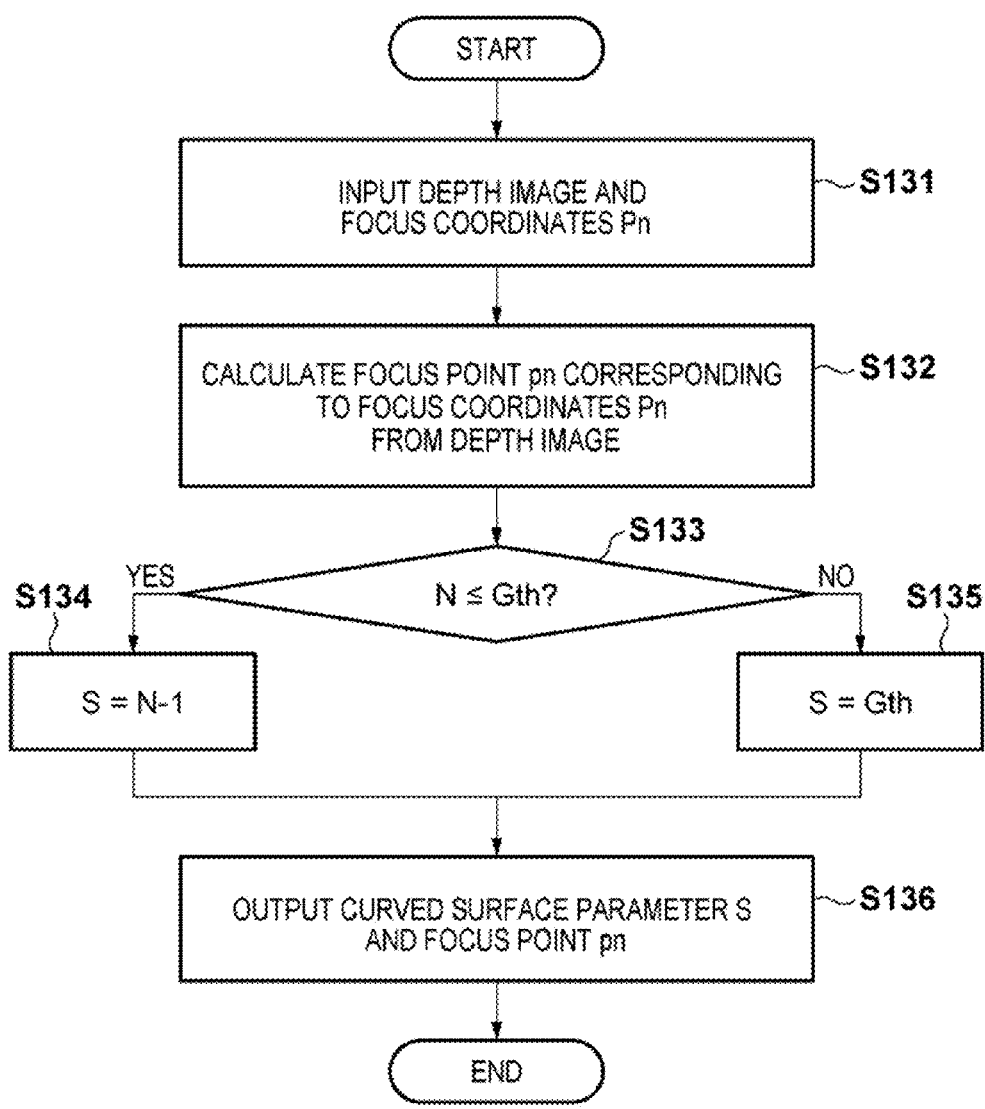
FIG. 8 is a flowchart for explaining the process of a virtual focus surface setting unit.

The process (step S104) of the virtual focus surface setting unit 113 will be described with reference to the flowchart of FIG. 8. The virtual focus surface setting unit 113 receives the depth image and the focus coordinates Pn (step S131) and calculates the focus points pn corresponding to the focus coordinates Pn from the depth image (step S132).

Figure 9:
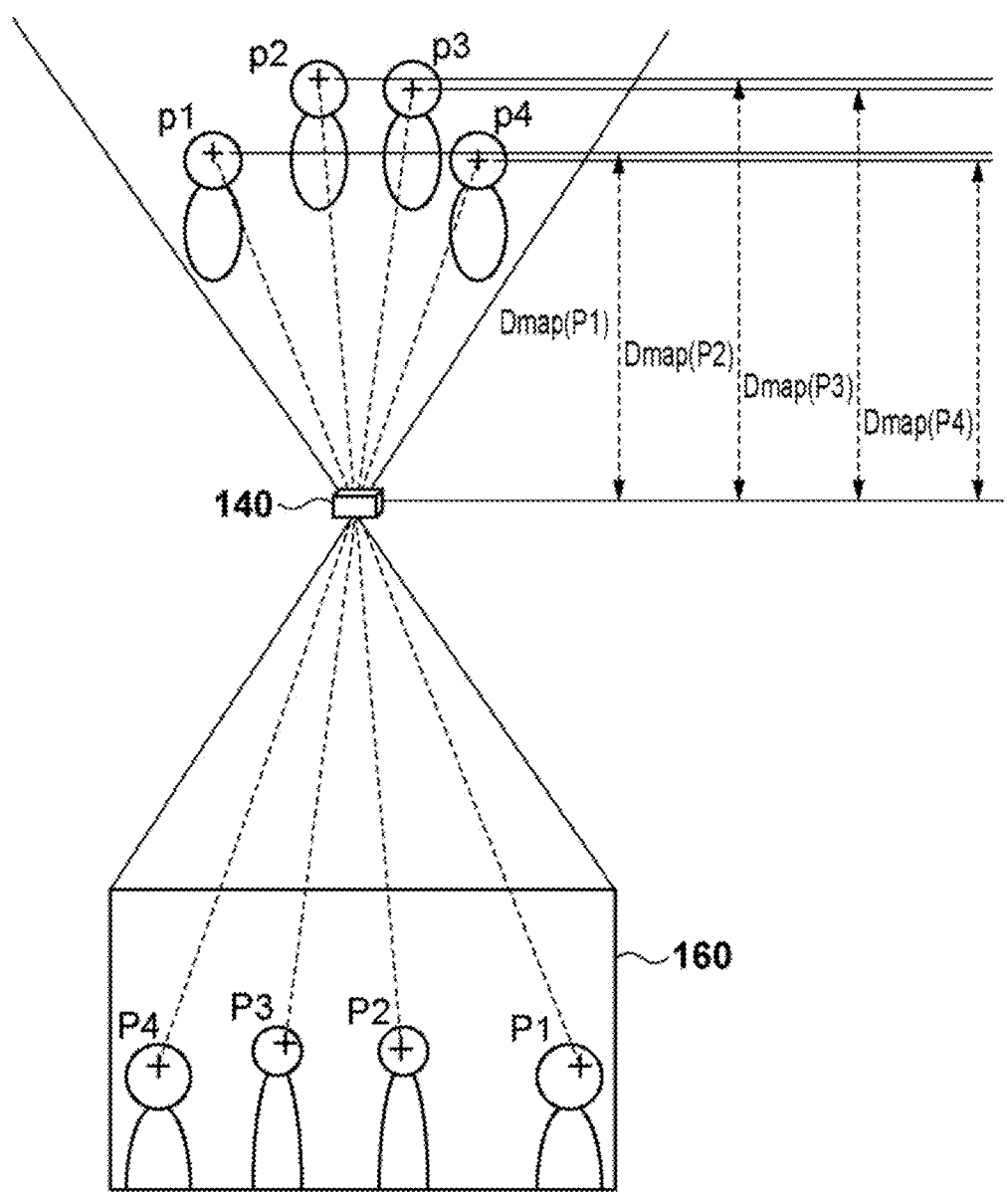
FIG. 9 is a view for explaining the relationship between focus points and focus coordinates.

The relationship between the focus points pn and the focus coordinates Pn will be described with reference to FIG. 9. The focus coordinates Pn are expressed as the xy coordinates of the reference image 160. As for the focus point pn, a focus point in the actual three-dimensional space corresponding to the focus coordinates Pn is expressed as xyz coordinates. Let Dmap be the two-dimensional array of the depth image, and Pn=(xn, yn). The distance of the focus coordinates Pn from the image capturing apparatus 140 is represented by Dmap (Pn). Hence, the focus point is represented by pn(x, y, z)=(xn, yn, Dmap(xn, yn)).

Next, the virtual focus surface setting unit 113 compares the number N of focus points pn with a predetermined number Gth (step S133). If N≤Gth, (N−1) is set to the curved surface parameter S (step S134). If N>Gth, the predetermined number Gth is set to the curved surface parameter S (step S135). Then, the curved surface parameter S and the focus points pn are output (step S136).

For example, when three focus points pn are present, the curved surface parameter S=2. The virtual focus surface generation unit 114 generates a focus surface from a quadratic curve. That is, a curve having a lower order can uniquely be decided by controlling the curved surface parameter S.

If the number of focus points pn is enormous, the order also becomes large and the focus surface becomes complex. As a result, the calculation cost for generating a focus surface may increase, or it may be impossible to generate a focus surface. Hence, if the number of focus points pn exceeds the predetermined number Gth, the order is limited to Gth.

When Gth=3, the curved surface parameter S=3, and the order of the focus surface is 3 even if the number of focus points pn exceeds 3. Even if the number N of focus points pn is as large as, for example, 10 or 20, the focus surface can be generated more simply by approximating it by a cubic curve. If the order is less than the number N of focus points pn, some focus points pn may fall outside the focus surface. Gth is appropriately decided in consideration of the number N of focus points pn and the calculation cost or made adjustable as needed.

Virtual Focus Surface Generation Unit

Virtual focus surface generation will be described with reference to FIGS. 10A to 10E. In FIGS. 10A to 10E, the origin corresponds to the position of the image capturing apparatus 140. FIGS. 10A to 10E show the three-dimensional space including objects observed from the y-axis direction. Hence, the z-axis in FIGS. 10A to 10E corresponds to the depth (capturing distance). Gth=3 in the following explanation.

Figure 10A:
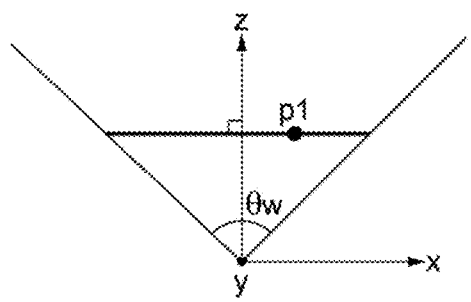
FIGS. 10A to 10E are views for explaining virtual focus surface generation.

FIG. 10A shows a case in which one focus point pn exists. The curved surface parameter S=0, and a virtual focus surface corresponding to a zero order curve is generated. That is, when N=1, a virtual focus surface perpendicular to the z-axis is generated.

Figure 10B:
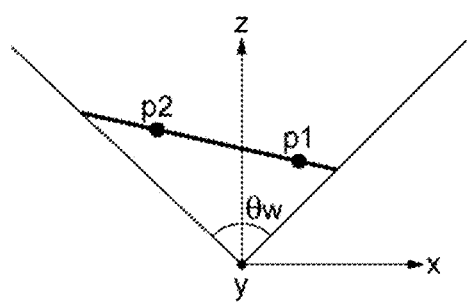

FIG. 10B shows a case in which two focus points pn exist. The curved surface parameter S=1, and a virtual focus surface corresponding to a linear curve passing through focus points p1 and p2 is generated.

Figure 10C:
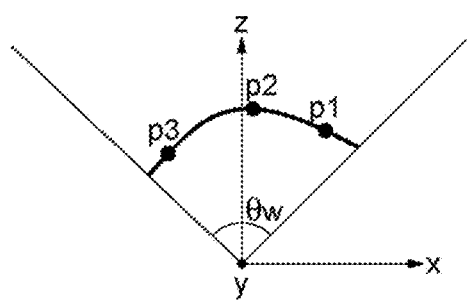

FIG. 10C shows a case in which three focus points pn exist. The curved surface parameter S=2, and a virtual focus surface corresponding to a quadratic curve passing through focus points p1, p2, and p3 is generated.

Figure 10D:
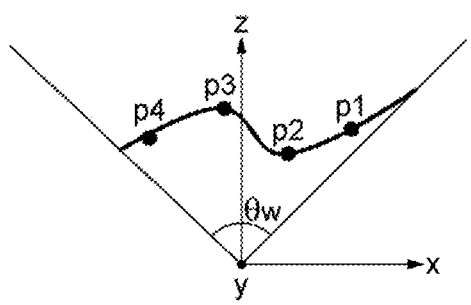

FIG. 10D shows a case in which four focus points pn exist (N>Gth). The curved surface parameter S=Gth=3, and a virtual focus surface corresponding to a cubic curve passing through focus points p1, p2, p3, and p4 is generated.

Figure 10E:
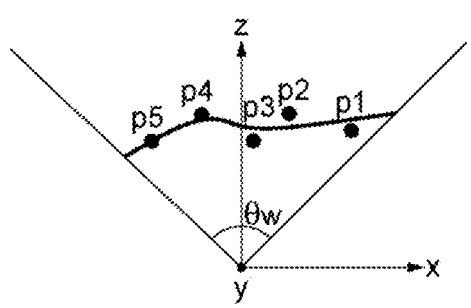

FIG. 10E shows a case in which five focus points pn exist (N>Gth). The curved surface parameter S=Gth=3, and a virtual focus surface corresponding to a cubic curve is generated. In this case, although not all the focus points p1 to p5 are necessarily placed on the virtual focus surface, a simple smooth curved surface is generated as the virtual focus surface.

Figure 11:
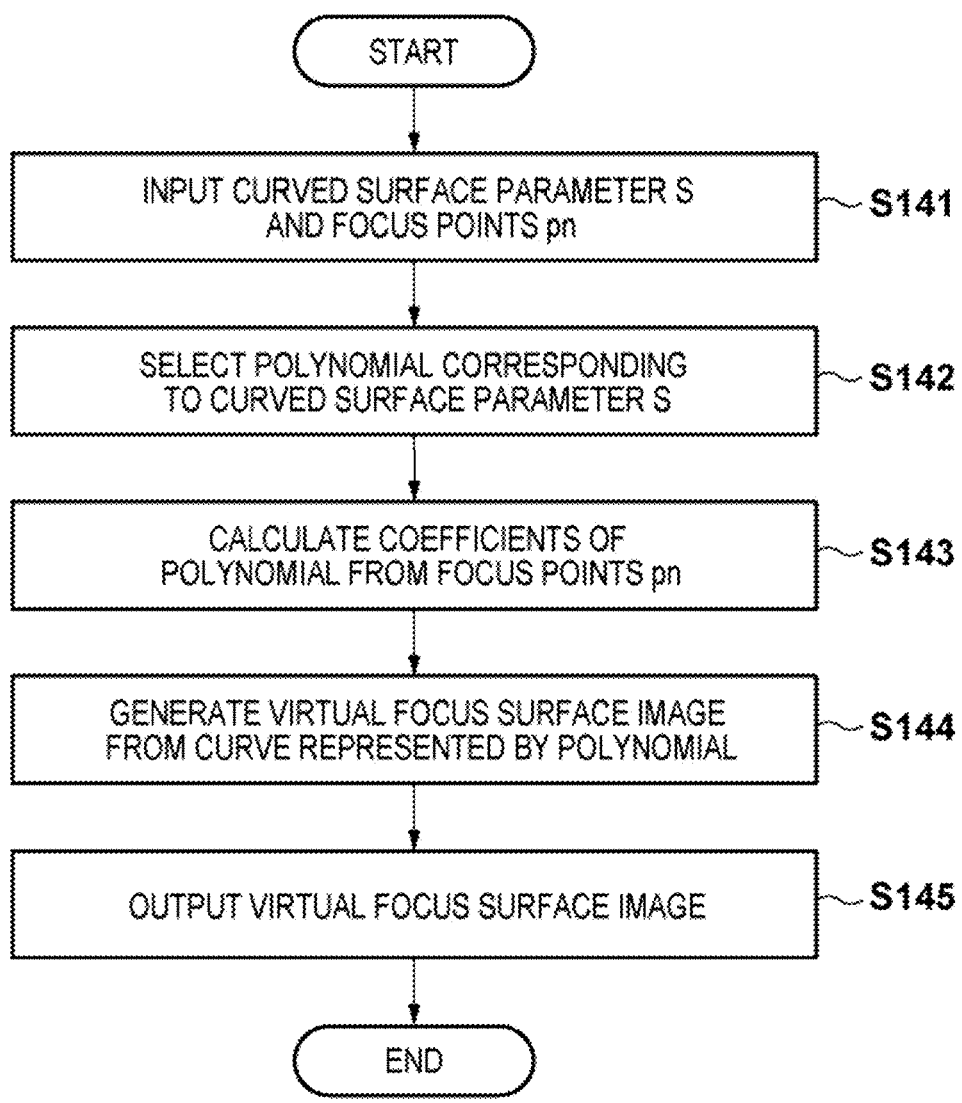
FIG. 11 is a flowchart for explaining the process of a virtual focus surface generation unit.

The process (step S105) of the virtual focus surface generation unit 114 will be described with reference to the flowchart of FIG. 11. The virtual focus surface generation unit 114 receives the curved surface parameter S and the focus points pn (step S141) and selects a polynomial corresponding to the curved surface parameter S (step S142). When Gth=3, the polynomials are given by if $(S==0) z=a;$ if $(S==1) z=ax+b;$ if $(S==2) z=ax^2+bx+c;$ if $(S==3) z=ax^3+bx^2+cx+d;$ \hfill (2)

Next, the virtual focus surface generation unit 114 calculates the coefficients of the polynomial from the focus points pn (step S143). The coefficients of the polynomial take a form (a, b), (a, b, c), or (a, b, c, d) in accordance with equation (2) selected. The focus point pn is expressed as xyz coordinate values. The polynomial is solved by the xz coordinates, thereby calculating the curve on the xz plane. The coefficient calculation method is known. For example, the coefficients can be calculated either by obtaining an approximate curve using the least squares method or by a matrix operation.

The virtual focus surface generation unit 114 then generates a virtual focus surface image from the curve represented by the polynomial using the calculated coefficients (step S144). That is, a two-dimensional image representing the z-coordinate values of the pixels of the reference image 160 on the virtual focus surface is generated from the curve represented by the polynomial and an angle θw of view contained in the image capturing apparatus information. The two-dimensional image is output as the virtual focus surface image (step S145).

The virtual focus surface (curved surface) and the virtual focus surface image will be explained with reference to FIGS. 12A to 12C. As shown in FIG. 12A, a curve 1201 passing through the three focus points pn is obtained and expanded in the y-axis direction so as to generate a virtual focus surface 1202. As shown in FIG. 12B, a grayscale value is set in correspondence with each depth of the virtual focus surface 1202, thereby generating a virtual focus surface image 1203. For example, a region where the density of the virtual focus surface image 1203 is high represents a region having a deep (far) focus surface, and a region where the density is low represents a region having a shallow (close) focus surface.

The curve 1201 may be calculated by a spline function passing through the xz coordinates of the focus points pn, which is given by $z=\Sigma_i C_i B_i(x)$ \hfill (3)

where x is the input value, z is the output value, $B_i(x)$ is the basis function, $C_i$ is the spline coefficient, and i is the basis function number.

However, the focus points are not always placed on the virtual focus surface.

To obtain an interpolation function passing through the desired focus points pn using the spline function, the spline coefficients are calculated from the given focus points pn. To calculate the spline coefficients, the vector of the focus point pn is set to $X=\{x_0, \ldots, x_N\}$ ($x_0 \leq \ldots \leq x_N$). The vector of the corresponding output value is set to $Z=\{z_0, \ldots, z_N\}$.

Next, nodes are set for the focus points pn. The nodes can arbitrarily be set as long as they satisfy Schoenberg-Whitney conditions. For example, the midpoints of the focus points pn or the same points as the focus points pn may be set as the nodes. The basis function is calculated from the set nodes. To calculate the basis function, the general DeBoor-Cox algorithm is used.

Next, from the focus points pn and the basis function, a coefficient matrix M given by $$M = \begin{bmatrix} B_0(x_0) & B_1(x_0) & \ldots & B_N(x_0) \\ B_0(x_1) & B_1(x_1) & \ldots & B_N(x_1) \\ \vdots & \vdots & & \vdots \\ \vdots & \vdots & & \vdots \\ B_0(x_N) & B_1(x_N) & \ldots & B_N(x_N) \end{bmatrix} \quad (4)$$

is generated.

In addition, letting C be the vector of the spline coefficients, the spline function is represented by a determinant given by $Z=MC$ \hfill (5)

When the determinant (5) is solved for the spline coefficients using LU decomposition or the like, the spline coefficient vector C can be obtained.

An example in which B-spline is used as the basis function has been described above. However, any other piecewise function such as a non uniform rational B-spline or a Bezier can be used as the basis function.

In the above-described example, the virtual focus surface 1202 have the same y-coordinate value. However, a curved virtual focus surface freely deformed even in the y-axis direction can be generated. In this case, the coefficients of a three-dimensional spline function are calculated. The three-dimensional spline function is represented by expanding the above-described linear spline function as $X=\Sigma_i\Sigma_j\Sigma_k\alpha_{ijk}B_i(y)B_j(z)B_k^z(x)$ $Y=\Sigma_i\Sigma_j\Sigma_k\beta_{ijk}B_i(y)B_j(z)B_k^z(x)$ $Z=\Sigma_i\Sigma_j\Sigma_k\gamma_{ijk}B_i(y)B_j(z)B_k^z(x)$ \hfill (6)

where the calculation range of $\Sigma_i$ is i=0 to N, the calculation range of $\Sigma_j$ is j=0 to N, and the calculation range of $\Sigma_k$ (is k=0 to N.

Like the linear spline function, the spline coefficients of each dimension are calculated. FIG. 12C shows an example of a curved virtual focus surface 1204 when there are four focus points pn.

Image Composition Unit

The image composition unit 115 sets a weighting coefficient for each image data. The image represented by each image data is shifted based on the virtual focus image and the image capturing apparatus information. In addition, the image data multiplied by the weighting coefficients are added to generate synthetic image data.

Figure 13:
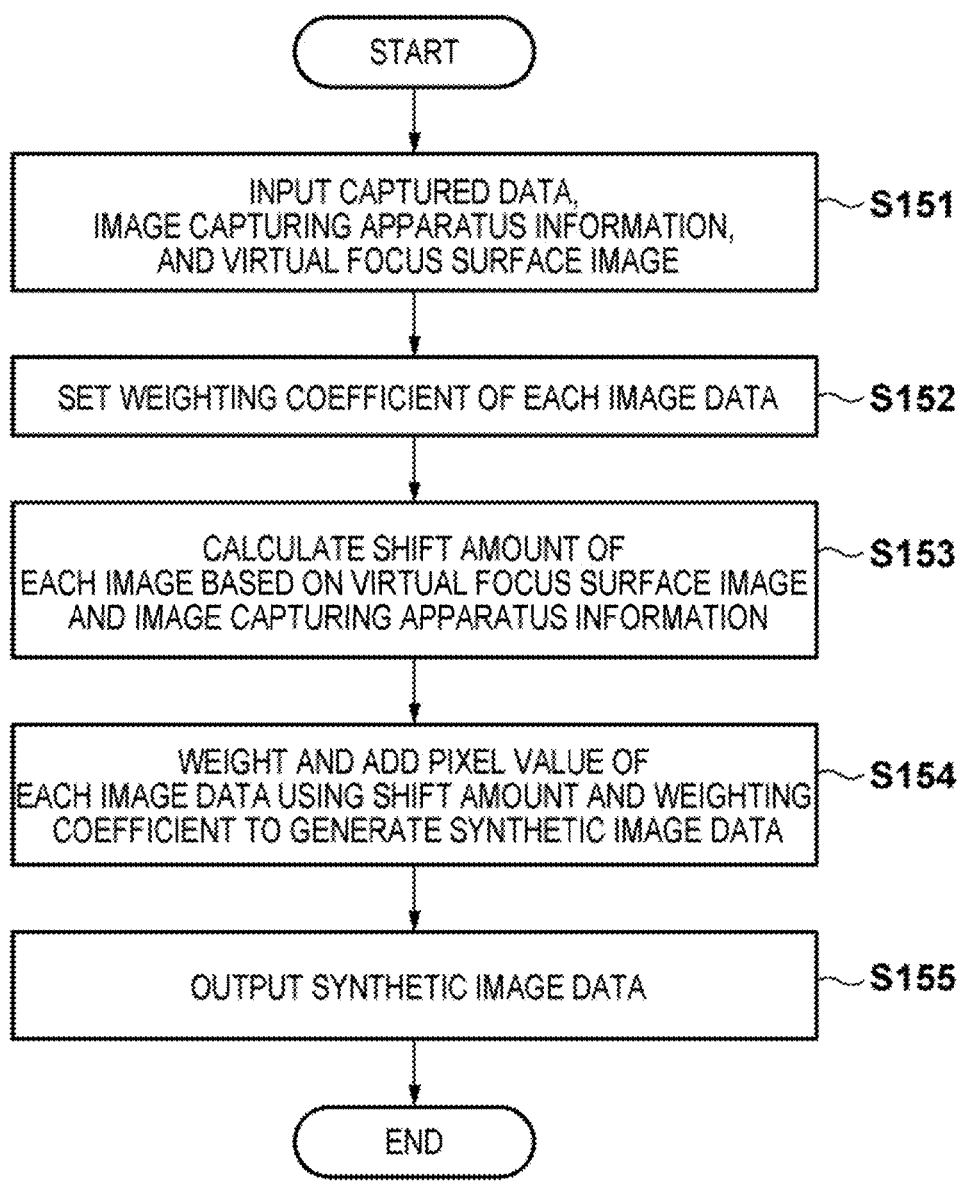
FIG. 13 is a flowchart for explaining the process of an image composition unit.

The process (step S106) of the image composition unit 115 will be described with reference to the flowchart of FIG. 13. The image composition unit 115 receives the captured data, the image capturing apparatus information, and the virtual focus surface image (step S151) and sets the weighting coefficients of the image data to be used to composite the images (step S152).

Figure 14:
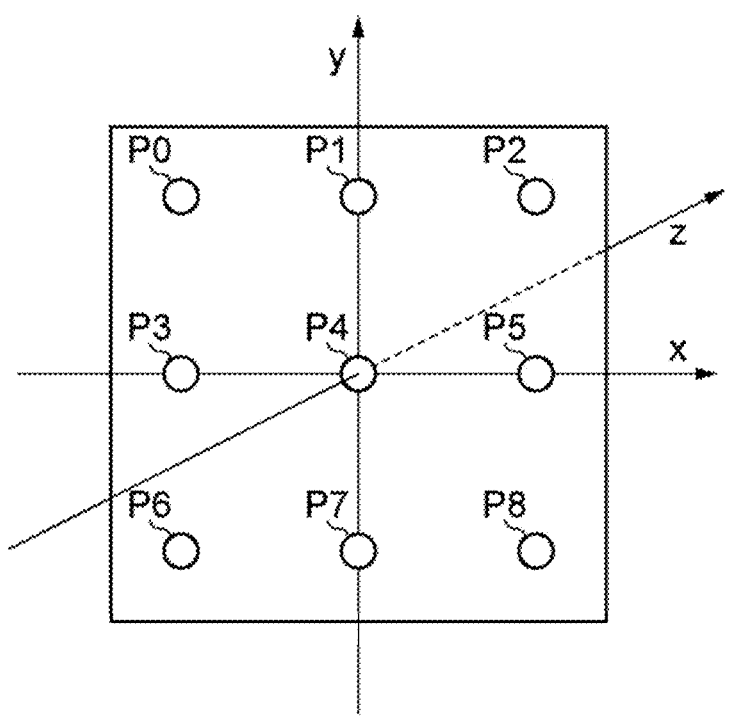
FIGS. 14A and 14B are views for explaining weighting coefficients.

The weighting coefficients will be described with reference to FIGS. 14A and 14B. FIG. 14A shows positions Pcm (cm=0 to 8) of the image capturing units 131 to 139. Let Im be an image represented by image data corresponding to the position Pcm, and A(m) be the weighting coefficient corresponding to the image Im. In this example, weighting coefficients according to a Gaussian function are set based on the weighting coefficient A(4) of the image capturing unit 135 arranged at a center P4 and normalized so that the sum of the weighting coefficients becomes 1 (see FIG. 14B). This allows to smoothly increase the defocus amount in the region outside the virtual focus surface. In other words, the images captured by the image capturing units 131 to 139 are composited while placing emphasis on the image captured by the image capturing unit 135.

Next, the image composition unit 115 calculates the shift amount of each image based on the virtual focus surface image and the image capturing apparatus information (step S153). Letting d be the capturing distance corresponding to the value of the pixel of interest of the virtual focus surface image, a horizontal shift amount $\Delta i(m, d)$ and a vertical shift amount $\Delta j(m, d)$ of the image Im are calculated by $$\Delta i(m,d)=(s_m-s')W/\{2d\cdot\tan(\theta w/2)\}$$

$$\Delta j(m,d)=(t_m-t')H/\{2d\cdot\tan(\theta h/2)\} \quad (7)$$

where d is the capturing distance represented by the virtual focus surface image, W is the image size in the horizontal direction, H is the image size in the vertical direction, $\theta w$ is the horizontal view angle of the image capturing unit, $\theta h$ is the vertical view angle of the image capturing unit, $(s_m, t_m)$ are the coordinates of Pcm on the xy plane, and (s', t') are the coordinates of the position Pc4 of the image capturing unit 135 on the xy plane.

The image composition unit 115 then shifts the pixels of each image data by the shift amounts, multiplies each image data by the corresponding weighting coefficient, and calculates the sum of the shifted and weighted pixel values (step S154), that is, performs weighted addition represented by $$H(i,j)=\Sigma_m A(m)Im(I+\Delta i(m,d),j+\Delta j(m,d)) \quad (8)$$

where H is synthetic image data. When the calculation has ended for all pixels, the image composition unit 115 outputs the synthetic image data (step S155).

In the above description, the weighting coefficient A(m) is a fixed value. However, the weighting coefficient A(m) may be input via the general-purpose I/F 106 as a process parameter.

As described above, when generating an image from a plurality of image data from different viewpoints, it is possible to easily generate an image having a shallow depth of field in which focus is obtained on an object located on a focus surface (or curved focus surface) that is not always a plane, and the blur smoothly increases in regions outside the focus surface.

Second Embodiment

Image processing according to the second embodiment of the present invention will be described next. Note that the same reference numerals as in the first embodiment denote the same parts in the second embodiment, and a detailed description thereof will be omitted.

In the first embodiment, an example has been described in which the shape of the virtual focus surface is decided from the number N of focus points pn. According to this method, when the number N increases, the shape of the virtual focus surface becomes complex, and the calculation cost drastically increases. To prevent this, in the second embodiment, an example will be described in which the shape of the virtual focus surface is decided from the number of groups into which focus points pn are grouped.

Figure 15:
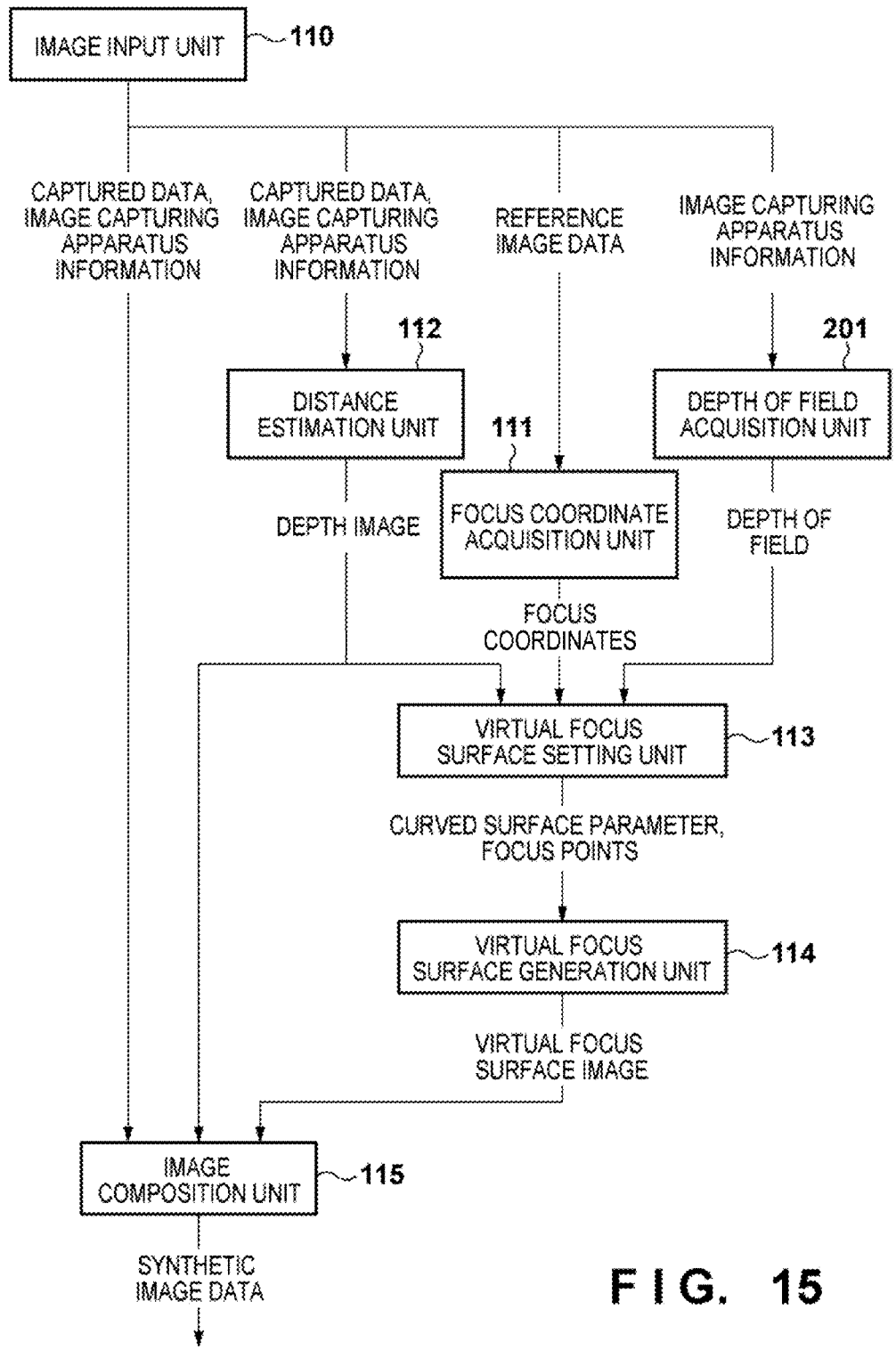
FIG. 15 is a block diagram for explaining the functional arrangement of an image processing apparatus according to the second embodiment.

The functional arrangement of an image processing apparatus according to the second embodiment will be described with reference to the block diagram of FIG. 15. Note that the functional arrangement shown in FIG. 15 is implemented by causing a CPU 101 to execute an image processing program. The functional arrangement of the second embodiment is different from that of the first embodiment in that a depth of field acquisition unit 201 is added.

The depth of field acquisition unit 201 acquires the depth of field at the time of image data capturing from the stop number represented by image capturing apparatus information and outputs information representing the depth of field. Note that the relationship between stop numbers and depths of field of an image capturing apparatus 140 is stored in a table stored in, for example, an HDD 105. Alternatively, information representing the depth of field added to image capturing apparatus information may be acquired, or the user may input the depth of field. A virtual focus surface setting unit 113 receives focus coordinates, a depth image, and the information representing the depth of field and calculates a curved surface parameter and a focus point.

Figure 16:
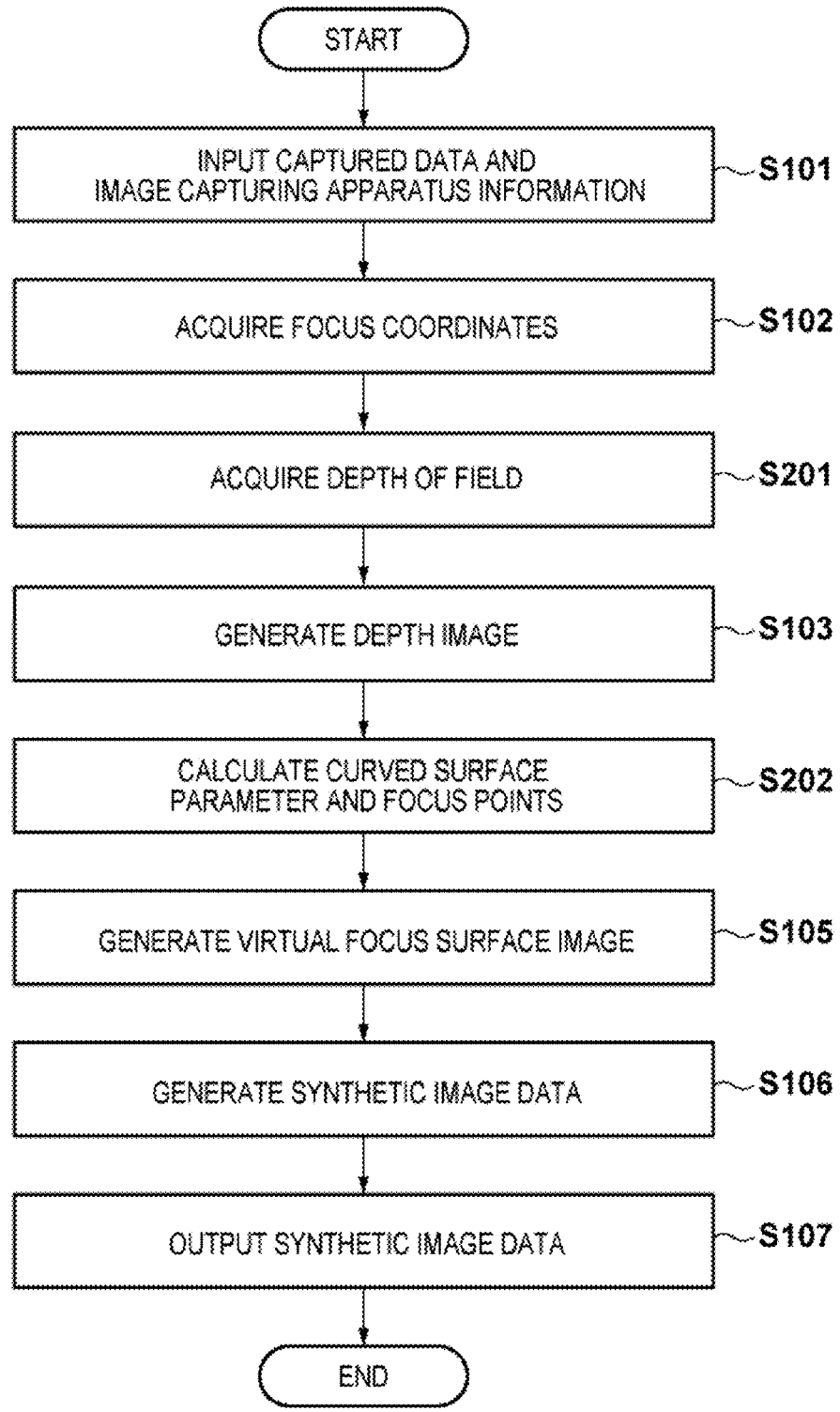
FIG. 16 is a flowchart for explaining image processing according to the second embodiment.

An example of image processing according to the second embodiment will be described with reference to the flowchart of FIG. 16. Note that the image processing shown in FIG. 16 is processing executed by the CPU 101 when, for example, a user instruction is input via the UI. The processes of steps S101 to S103 and S105 to S107 are the same as in the first embodiment, and a detailed description thereof will be omitted.

After acquiring focus coordinates Pn (step S102), the CPU 101 causes the depth of field acquisition unit 201 to acquire depth of field (step S201). After generating a depth image (step S103), the CPU 101 causes the virtual focus surface setting unit 113 to execute virtual focus surface setting processing and thus calculate a curved surface parameter S and the focus point pn (step S202).

Figure 17:
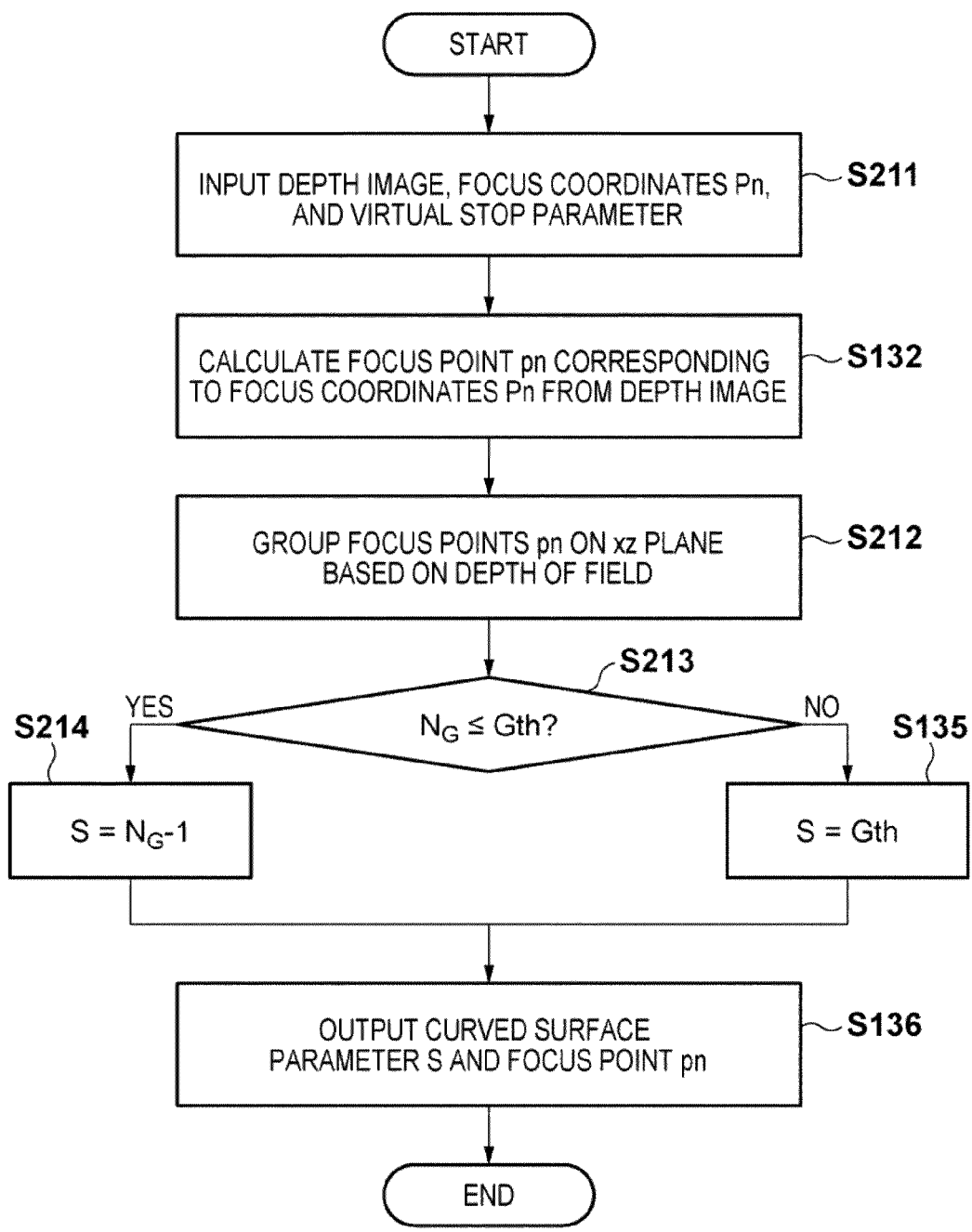
FIG. 17 is a flowchart for explaining the process of a virtual focus surface setting unit.

The process (step S202) of the virtual focus surface setting unit 113 will be described with reference to the flowchart of FIG. 17. Note that the processes of steps S132, S135, and S136 are the same as in the first embodiment, and a detailed description thereof will be omitted.

The virtual focus surface setting unit 113 receives the depth image, the focus coordinates Pn, and the information representing the depth of field (step S211), calculates the focus points pn (step S132), and groups the focus points pn on the xz plane based on the depth of field (step S212). The virtual focus surface setting unit 113 compares the number $N_G$ of groups with a predetermined number Gth (step S213). If $N_G \leq$ Gth, $(N_G-1)$ is set to the curved surface parameter S (step S214). If $N_G >$ Gth, the predetermined number Gth is set to the curved surface parameter S (step S135).

Objects included in the depth of field can be handled as one object. Hence, grouping objects corresponding to the focus points pn included in the depth of field makes it possible to obtain an image having focus on the focus points pn even using a surface (or curved surface) with a lower order.

Figure 18:
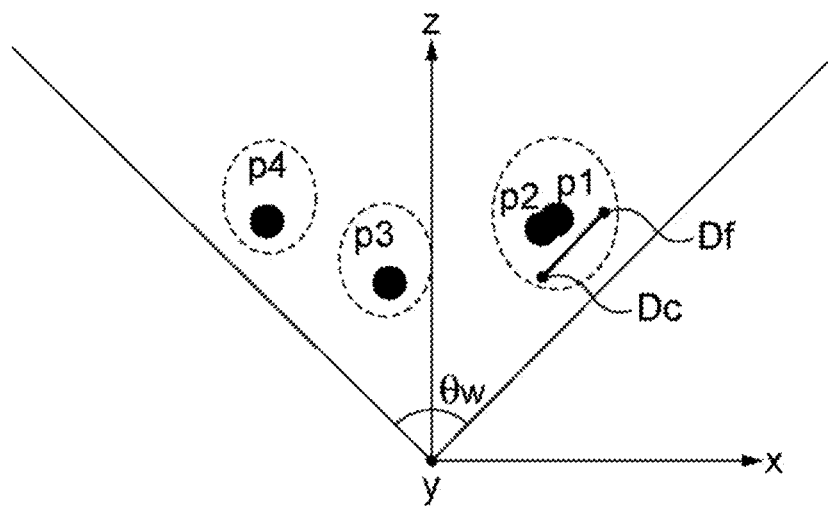
FIG. 18 is a view for explaining grouping focus points.

Grouping of the focus points pn will be described with reference to FIG. 18. FIG. 18 shows the three-dimensional space including objects observed from the y-axis direction, like FIGS. 10A to 10E. A distance D between the focus points pn on the xz coordinates is compared with a depth of field (Dc-Df). The focus points pn whose distance D falls within the range of (Dc-Df) (depth of field) are grouped.

In the example shown in FIG. 18, focus points p1 and p2 are grouped because the distance between them is included within the range of (Dc-Df). Focus points p3 and p4 are not grouped because the distance between them is not included within the range of (Dc-Df). Hence, the number $N_G$ of groups is 3.

The subsequent processing is executed while defining the average coordinates of the grouped focus points as the focus point of the group. For example, when the focus points p1 and p2 are grouped, a representative focal point Gi(x, y, z) of the group is calculated by $$Gi(x)=\{p1(x)+p2(x)\}/2$$

$$Gi(y)=\{p1(y)+p2(y)\}/2$$

$$Gi(z)=\{p1(z)+p2(z)\}/2 \quad (9)$$

Note that the representative focal point of a group including only one focus point equals that focus point, as a matter of course.

[Modification]

In the above-described examples, the user designates the focus coordinates Pn via the UI. However, an object or a human face in a captured image may be recognized as an object region, and the position of the object region may be used as the focus coordinates Pn.

That is, the focus coordinate acquisition unit 111 recognizes an object region from a reference image. Note that the object recognition is performed using an existing technique. For example, to detect an object such as a flower vase from a reference image, a method disclosed in Japanese Patent Laid-Open No. 2011-053959 is used. To recognize a human face, a method disclosed in Japanese Patent Laid-Open No. 2009-060379 is used.

Figure 19:
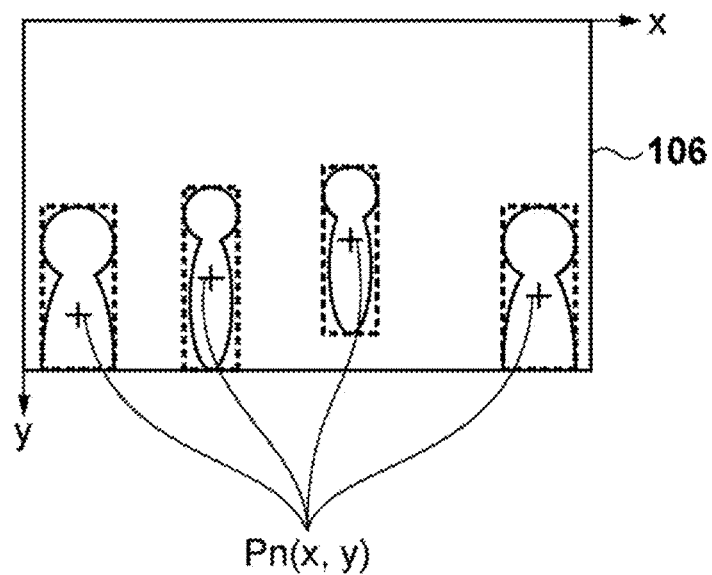
FIG. 19 is a view showing an example of an object region recognition result.

FIG. 19 shows an example of an object region recognition result. The focus coordinate acquisition unit 111 extracts, for example, regions surrounded by broken lines in FIG. 19 from the reference image 160 as object regions, and outputs the coordinates at the center of each object region as the focus coordinates Pn.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-122597, filed May 31, 2011, which is hereby incorporated by reference herein in its entirety.

What is claimed is:

1. An image processing apparatus comprising:
   an image input unit configured to input a plurality of images, each of which corresponds to a different viewpoint, obtained by capturing the images from a plurality of viewpoints;
   an image generation unit configured to composite the plurality of images to generate a synthetic image with a curved focus surface of the synthetic image, wherein the curved focus surface is set based on focus coordinates of the plurality of images in a three-dimensional space;
   an acquisition unit configured to acquire focus coordinates representing a plurality of positions to be in focus in the synthetic image; and
   a surface generation unit configured to generate information representing the curved focus surface from a distance to an object and the acquired focus coordinates, wherein a curvature of the curved focus surface is determined in accordance with a number of the acquired focus coordinates,
   wherein the image generation unit is configured to composite the plurality of images based on the information representing the curved focus surface, and
   wherein the image generation unit is implemented using a processor.

2. The apparatus according to claim 1, wherein the image generation unit generates the synthetic image having focus on the curved focus surface in each pixel of the synthetic image.

3. The apparatus according to claim 1, wherein the surface generation unit sets a curve having an order corresponding to the number of acquired focus coordinates and passing through the focus coordinates, and expands the curve to obtain the focus surface.

4. The apparatus according to claim 3, wherein the surface generation unit limits the order not to exceed a predetermined number.

5. The apparatus according to claim 1, further comprising a depth input unit configured to input a depth of field of the plurality of images,
   wherein the surface generation unit sets a curve having an order corresponding to a number of groups obtained by grouping the focus coordinates based on the depth of field and passing through representative focus coordinates of the groups, and expands the curve to obtain the focus surface.

6. The apparatus according to claim 1, further comprising an estimation unit configured to estimate the distance to the object from the plurality of images, wherein the image input unit is further configured to input information representing capturing position of the plurality of images, and the estimation unit estimates the distance to the object from the plurality of images and the information representing capturing positions of the plurality of images.

7. The apparatus according to claim 6, wherein the image generation unit comprises:
   a setting unit configured to set a weighting coefficient of each of the plurality of images; and
   a calculation unit configured to calculate a shift amount of each of the plurality of images based on the information representing the capturing positions and the information representing the curved focus surface, wherein the image generation unit is configured to generate the synthetic image by shifting each of the plurality of images by the shift amount calculated by the calculation unit, multiplying each of the shifted images by the weighting coefficient set by the setting unit, and compositing the plurality of images, each of which is shifted and multiplied according to the shift amount and the weighting coefficient.

8. An image capturing apparatus comprising:
a plurality of capturing units which capture an object from a plurality of viewpoints; and
an image processing apparatus described in claim 1.

9. The apparatus according to claim 1, wherein the curved focus surface is curved in a direction of an axis perpendicular to an image plane of the synthetic image.

10. The apparatus according to claim 1, wherein the curved focus surface is a surface on which the synthetic image is focused best, and an object not on the curved focus surface is defocused more than an object on the curved focus surface.

11. An image processing method comprising:
using a processor to perform the steps of:
inputting a plurality of images, each of which corresponds to a different viewpoint, obtained by capturing the images from a plurality of viewpoints;
compositing the plurality of images to generate a synthetic image with a curved focus surface of the synthetic image, wherein the curved focus surface is set based on focus coordinates of the plurality of images in a three-dimensional space;
acquiring focus coordinates representing a plurality of positions to be in focus in the synthetic image; and
generating information representing the curved focus surface from a distance to an object and the acquired focus coordinates, wherein a curvature of the curved focus surface is determined in accordance with a number of the acquired focus coordinates,
wherein, in the compositing step, the plurality of images are composited based on the information representing the curved focus surface.

12. A non-transitory computer readable medium comprising a computer-executable program for causing a computer to perform an image processing method, the method comprising the steps of:
inputting a plurality of images, each of which corresponds to a different viewpoint, obtained by capturing the images from a plurality of viewpoints;
compositing the plurality of images to generate a synthetic image with a curved focus surface of the synthetic image, wherein the curved focus surface is set based on focus coordinates of the plurality of images in a three-dimensional space;
acquiring focus coordinates representing a plurality of positions to be in focus in the synthetic image; and
generating information representing the curved focus surface from a distance to an object and the acquired focus coordinates, wherein a curvature of the curved focus surface is determined in accordance with a number of the acquired focus coordinates,
wherein, in the compositing step, the plurality of images are composited based on the information representing the curved focus surface.

13. An image processing apparatus comprising:
an image input unit configured to input a plurality of images, each of which corresponds to a different viewpoint, obtained by capturing the images from a plurality of viewpoints;
a surface setting unit configured to set a curved focus surface to be focused on in an image; and
an image generation unit configured to composite, based on the curved focus surface set by the surface setting unit, the plurality of images to generate a synthetic image having focus on the curved focus surface, wherein the curved focus surface is set based on focus coordinates of the plurality of images in a three-dimensional space,
wherein the surface setting unit comprises:
an acquisition unit configured to acquire focus coordinates representing a plurality of positions to be in focus in the synthetic image; and
a surface generation unit configured to generate information representing the curved focus surface from a distance to an object and the acquired focus coordinates, wherein a curvature of the curved focus surface is determined in accordance with a number of the acquired focus coordinates,
wherein the image generation unit is configured to composite the plurality of images based on the information representing the curved focus surface, and
wherein the image generation unit is implemented using a processor.

* * * * *